United States Patent
Bengtson (10) Patent No.: US 7,082,840 B2
(45) Date of Patent: Aug. 1, 2006

(54) FLANGED VORTEX FLOWMETER WITH UNITARY TAPERED EXPANDERS

(75) Inventor: Darroll D. Bengtson, New Brighton, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/700,263

(22) Filed: Nov. 3, 2003

(65) Prior Publication Data

US 2005/0092101 A1    May 5, 2005

(51) Int. Cl.
*G01F 1/32* (2006.01)
(52) U.S. Cl. .................................... 73/861.22
(58) Field of Classification Search ............. 73/861.22, 73/861.24
See application file for complete search history.

(56) References Cited

U.S. PATENT DOCUMENTS

| | | | |
|---|---|---|---|
| 4,186,599 A | 2/1980 | Frick ........................... 73/194 |
| 4,841,781 A * | 6/1989 | Khalifa ..................... 73/861.22 |
| 4,926,695 A | 5/1990 | Kleven et al. ........... 73/861.24 |
| 5,052,229 A * | 10/1991 | Tanimura et al. ........ 73/861.22 |
| 6,053,053 A | 4/2000 | Huotari .................... 73/861.22 |
| 6,658,945 B1 * | 12/2003 | Kleven ..................... 73/861.22 |

OTHER PUBLICATIONS

Product Data Sheet, Dec. 2001, Model 8800C, Model 8800C Smart Vortex Flowmeter, of Emerson Process Management, pp. 1-27.

* cited by examiner

*Primary Examiner*—Jewel V. Thompson
(74) *Attorney, Agent, or Firm*—Westman, Champlin & Kelly (57) ABSTRACT

A manufacturing procedure of a vortex flowmeter is disclosed that allows for assembly of a vortex sensor assembly with one of two or more unitary flowtubes that have bores that are smaller than the flowtube flanges in two or more size number steps. The unitary flowtubes include flanges, flowtube bores and expanders (also called reducers) that provide a smooth flow transition from the larger flanges to the smaller bores.

10 Claims, 9 Drawing Sheets

| SIZE NUMBER, N | NOMINAL INSIDE DIAMETER | TYPICAL FLOW RANGE, GPM FOR VORTEX FLOWMETER |
| --- | --- | --- |
| 1 | 1/2 INCH | 0.4 - 5.4 |
| 2 | 1 INCH | 0.7 - 15 |
| 3 | 1-1/2 INCH | 1.1 - 36 |
| 4 | 2 INCH | 1.8 - 59 |
| 5 | 3 INCH | 4.0 - 130 |
| 6 | 4 INCH | 6.9 - 230 |
| 7 | 6 INCH | 16 - 510 |
| 8 | 8 INCH | 27 - 890 |
| 9 | 10 INCH | 52 - 1400 |
| 10 | 12 INCH | 89 - 2000 |

| SIZE NUMBER N, FLANGES | SIZE NUMBER N, VORTEX FLOWMETER BORE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | | | | | | | | | | | | |
| 2 | X | | | | | | | | | | | |
| 3 | X | X | | | | | | | | | | |
| 4 | | X | X | | | | | | | | | |
| 5 | | | X | X | | | | | | | | |
| 6 | | | | X | X | | | | | | | |
| 7 | | | | | X | X | | | | | | |
| 8 | | | | | | X | X | | | | | |
| 9 | | | | | | | | X | X | | | |
| 10 | | | | | | | | | X | X | | |
| 11 | | | | | | | | | | X | X | |
| 12 | | | | | | | | | | | X | X |
| 13 | | | | | | | | | | | X | X |
| 14 | | | | | | | | | | | | X |
| 15 | | | | | | | | | | | | |

FIG. 10

FLANGED VORTEX FLOWMETER WITH UNITARY TAPERED EXPANDERS

FIELD OF THE INVENTION

This invention relates to flanged vortex flow meters. In particular, this invention relates to connecting a vortex flowmeter to a flanged piping system that has a diameter that is larger than a diameter of the vortex flowmeter bore.

BACKGROUND OF THE INVENTION

Vortex flowmeters are used in the industrial process control field for measuring a flow rate of a fluid. Vortex flowmeters are typically inserted in a flow pipe or conduit that carries the fluid to be measured. Industry applications include petroleum, chemical, pulp and paper, mining and materials, oil and gas. The operating principal of a vortex flowmeter is based on a phenomenon of vortex shedding known as the von Karman effect. As fluid passes a bluff body, it separates and generates small eddies or vortices that are shed alternately along and behind each side of the bluff body. These vortices cause areas of fluctuating pressure that are detected by a sensor. While the frequency of vortex generation is essentially proportional to fluid velocity, this proportionality varies with the conduit Reynolds number. The conduit Reynolds number is a function of the fluid density, the fluid viscosity, the fluid velocity, and the inside diameter of the conduit.

In piping systems, there is a desire to keep the Reynolds number low in order to reduce power loss in the piping system. This desire to reduce power loss leads to use of larger pipe sizes and lower ranges of fluid flow velocity in the piping system.

In vortex flowmeters, there are limits to the range of flows that are measurable. When flow velocities are below a lower limit of measurable flow, the vortex flowmeter cannot be relied upon to provide an accurate indication of flow.

There is a need to provide a vortex flowmeter with an accurate flow output over a range of flows found in piping systems where a larger pipe size is used to reduce power loss.

SUMMARY OF THE INVENTION

A manufacturing procedure of a vortex flowmeter is disclosed that allows for assembly of a vortex sensor assembly with one of two or more unitary flowtubes that have bores size numbers that are smaller than flowtube flange size numbers in two or more size number steps. The unitary flowtubes include flanges, flowtube bores and expanders that provide a smooth flow transition from the larger flanges to the smaller bores that is free of joints between the flowtube bore and the expanders.

In one preferred arrangement, the unitary flowtubes are formed as a single unitary casting. In another preferred arrangement, a flow conditioner is cast in an upstream flange of the unitary flowtube.

DETAILED DESCRIPTION OF THE PREFERRED EMBODIMENTS

A manufacturing procedure for a vortex flowmeter is disclosed that allows for assembly of a vortex sensor assembly with one of two or more unitary flowtubes that have bores that are smaller than the flowtube flanges in two or more size number steps. The unitary flowtubes include flanges, flowtube bores and expanders (also called reducers) that provide a smooth flow transition from the larger flanges to the smaller bores. The methods disclosed allow for many combinations of bore size numbers and flange size numbers to be assembled to obtain a desired flow range while having only a single type of vortex sensor with a standard sensor interface in inventory.

The flow from a flanged piping system connected to the vortex flowmeter is increased in velocity as it passes through the smaller bore. This arrangement effectively shifts the fluid flow into the measurement range of the vortex flowmeter so that the flow can be measured accurately. In embodiments where the pipe diameter is two standard sizes larger than the flowmeter bore, it is very important to manage the internal surfaces as well as the flow, since the Reynolds number through the flowmeter may be substantially higher locally. The unitary flowtubes are formed as a unitary component so there are no seams between the flowtube bore and the expanders that could cause flow disturbances and inaccuracies. Additionally, some embodiments include flow conditioners to mitigate the effects of any flow asymmetries since asymmetries are magnified as they pass through the smaller bore. With the disclosed arrangements, the energy savings of using larger flanged pipe in the piping system are achieved along with an accurate flow measurement.

Although it is possible to generate flow vortices in a vortex flowmeter with Reynolds numbers in the range of 2000–10,000, the frequency of the vortices at these low flow rates is not predictably linear. Generally, a Reynolds number of 20,000 is a lower limit for linear flow measurement. An additional lower limit on vortex meter operation is found in the minimum velocity that can be detected by the sensors in the vortex flowmeters. There are different detection limits depending on whether the fluid is a liquid or a gas, and in particular detection depends on fluid density and velocity.

Figure 1:
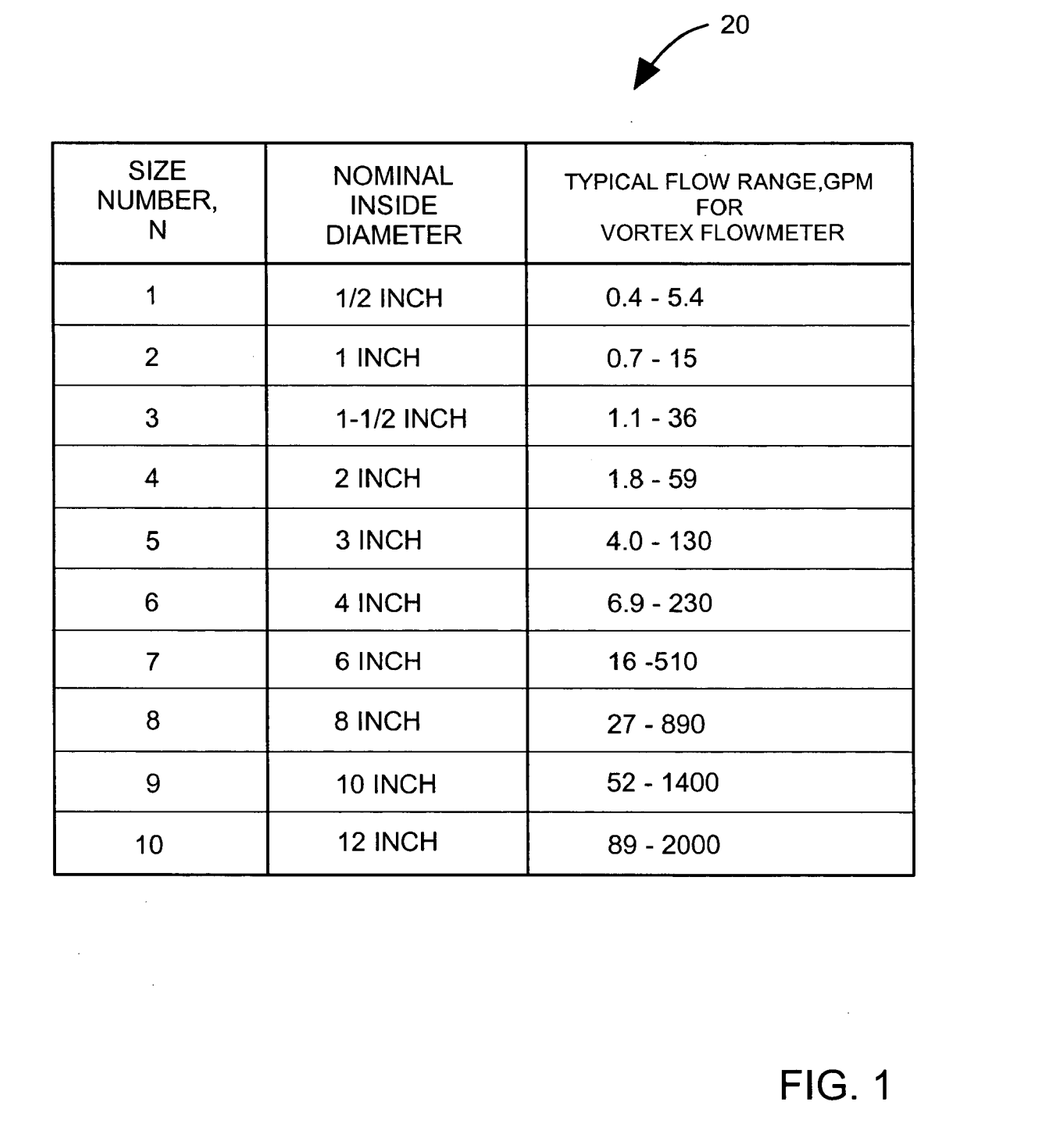
FIG. 1 illustrates a table of size numbers of pipes and vortex flowmeters.

FIG. 1 illustrates a table 20 of size numbers of flanged pipes and of vortex flowmeters. As can be seen in FIG. 1, piping systems are designed using nominal pipe sizes such as ½ inch, 1 inch, 1½ inch and so forth. In this application, these sequentially increasing nominal pipe sizes are designated by a sequentially increasing size number (N, M, etc.) for convenience in describing embodiments of the invention. Examples of typical vortex flowmeter measurement ranges are shown in FIG. 1 in gallons per minute (GPM) for a vortex flowmeter that has a bore with the nominal diameter indicated in the table in FIG. 1. It will be understood by those skilled in the art that the actual inside diameter of a vortex flowmeter bore may be slightly smaller than the actual inside diameter of a flanged pipe of the same nominal inside diameter. The actual inside diameters of flanged pipes are specified by ASME Standards B36.10, ASME B36.19 and ISO Standards ISO 4200, ISO 1127. As can be seen from the example in FIG. 1, the flow ranges of the vortex flowmeters are limited and also overlap one another.

Vortex flowmeters are designed for installation in flanged piping systems that include different pressure ranges and a range of sizes in standardized steps of nominal pipe diameters such as ½", ¾", 1", 1½", 2" and larger sizes. Vortex flowmeters are manufactured with flowmeter flanges adapted to mate with pipe flanges of these standardized steps, and with nominal diameters that correspond with the nominal pipe diameters.

The accuracy of vortex flowmeters is sensitive to flow disturbances. For example, if gasket material between flanges extends into the flow stream, the gasket can disturb the flow and cause inaccurate measurements. Vortex flowmeters are usually installed between pipes with a minimum of 10 straight pipe diameters upstream and 5 straight pipe diameters downstream from the vortex flowmeter to reduce the effects of flow disturbances on accuracy. For some types of flow disturbances, up to 35 diameters upstream may be needed to assure accuracy.

In the design of process piping systems, it is common practice to "oversize" piping to reduce flow velocities and thereby reduce the high energy costs of pumping fluid through the process piping system. With the oversize piping, flow rates can easily drop below the linear range of a vortex flowmeter with the same nominal diameter as the pipes. The vortex flowmeter cannot measure the low end of the flow range while also utilizing the upper range capability of the vortex flowmeter since the upper range capability is beyond the upper range of pipe flow. When this situation occurs, it is necessary to provide an "undersized" vortex flow meter that is undersized by one pipe size step and use pipe reducers to connect the undersized vortex flowmeter to the large sized pipes. In many cases, this will increase the flow velocity in the vortex flowmeter enough to measure the lower pipe flow velocities, without incurring an unacceptable increase in energy costs due to the pressure drop across the vortex flowmeter.

Figure 2:
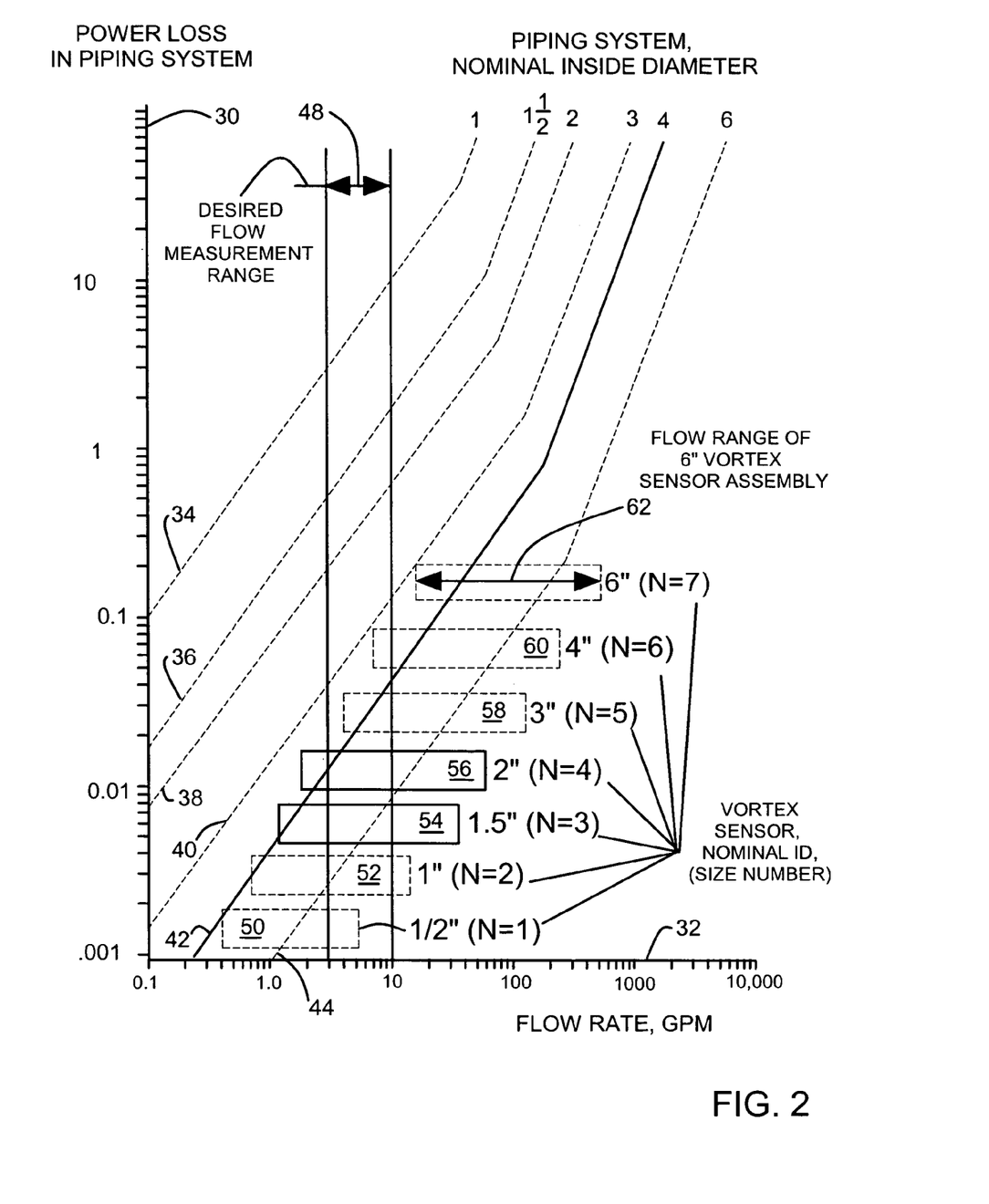
FIG. 2 illustrates a graph of power loss in piping systems as a function of flow rate.

FIG. 2 illustrates a graph of relative power loss in piping systems as a function of flow rate. A vertical axis 30 represents relative power loss in a piping system in which a vortex flowmeter is used. The power loss is shown only on a relative scale and actual power loss calculations can be scaled based on the composition of the fluid, its temperature and other factors. A horizontal axis 32 represents flow rate in gallons per minute (GPM). The vertical and horizontal axes 30, 32 have logarithmic scales. Generally diagonal lines 34, 36, 38, 40, 42, 44 represent the relative power loss as a function of volumetric flow rate for piping systems of nominal diameters 1, 1½, 2, 3, 4 and 6 inches, respectively. For a given desired flow measurement range 48 of about 3–10 gallons per minute, it can be seen that the relative power loss in the piping system decreases as the nominal pipe size increases. To take advantage of this decrease in power loss, a relatively large size pipe such as a 4 inch pipe can be selected as indicated by the solid line 42.

The flow ranges of vortex flowmeters are shown as rectangular boxes 50, 52, 54, 56, 58, 60, 62 corresponding to nominal sizes of vortex flowmeter bores having nominal diameters ½, 1, 1½, 2, 3, 4 and 6 inches, respectively. By comparing the flow range 60 of a 4 inch bore flowmeter with the desired measurement range 48, it can be seen that the flow range 60 covers only a small upper portion of the desired flow range 48. It can also be seen that a 2 inch flowmeter or a 1½ inch flowmeter will cover the entire desired flow measurement range 48. In other words, in this particular example, the piping system has a size number N=6 (4" diameter with power loss curve 42) and the bore of vortex flowmeters that will accurately measure the desired flow range 48 are size number N=4 (at 56) and N=3 (at 54). The size number N=2 also covers the measurement range, but would result in excessive power loss because of its small size. If a smaller size flanged vortex flowmeter were connected to the larger piping system using conventional flanged reducers and gaskets, the arrangement would be at risk of deviating substantially from the factory calibration of the vortex flowmeter due to the irregularities of mating of the multiple flanges and the protrusion of portions of gaskets into the flowstream. The installation costs of providing two flanged reducers and assembling four flanged pipe connections is very high. This problem is overcome, as explained below in connection with FIGS. 3–10 by providing a unitary flowtube that does not have flanged connections or gaskets between the bore of the flowmeter and the reducers.

Figure 3:
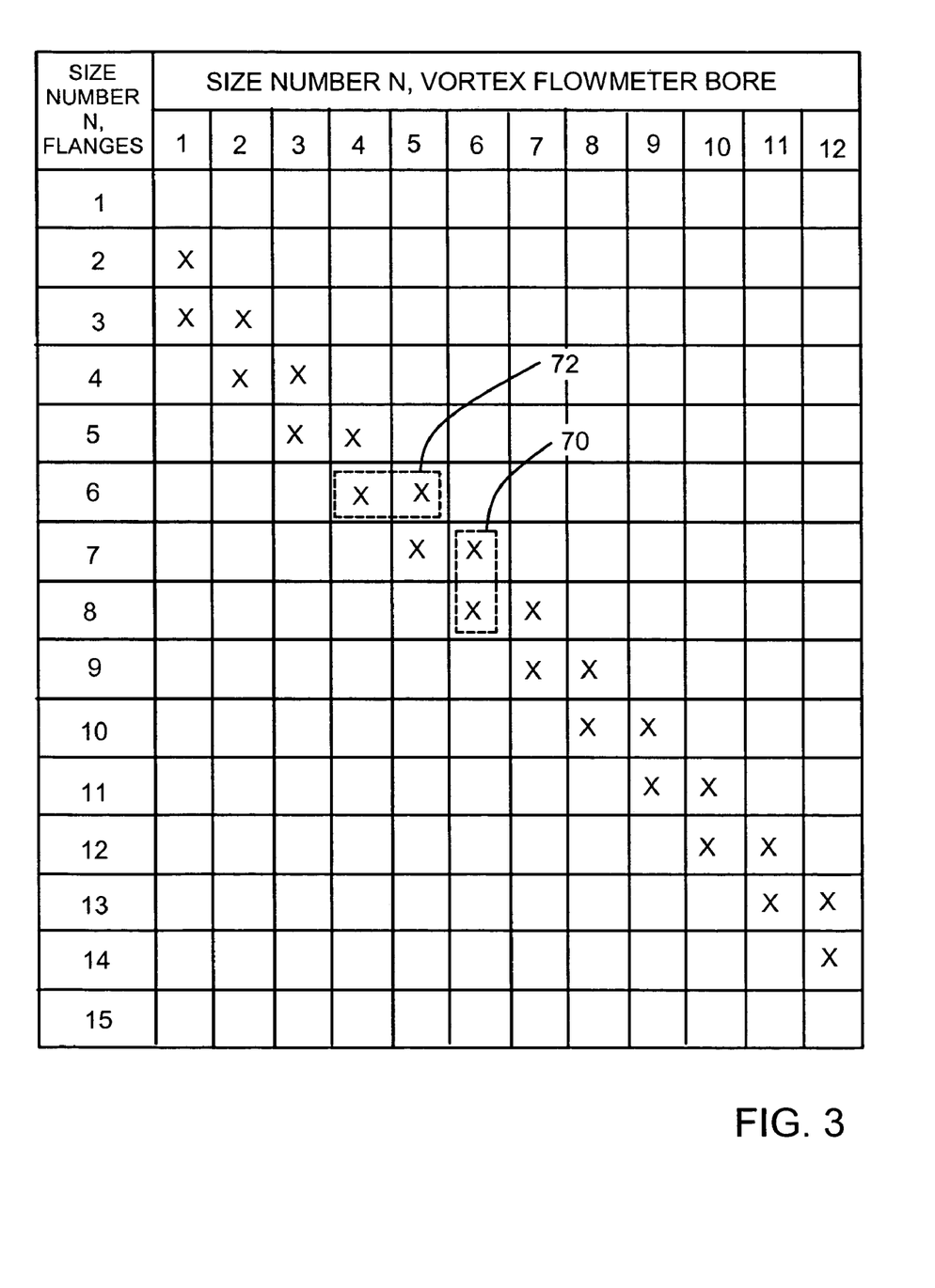
FIG. 3 illustrates a table of combinations of size numbers for flanges and size numbers for vortex sensor assemblies.

FIG. 3 illustrates an example of a table or matrix of combinations of size numbers for flanges and size numbers for bores of vortex unitary flowtubes. The "size numbers" are explained above in connection with FIG. 1. In this particular example, each of the combinations that is provided in a manufacturing process is marked with an X, and combinations that are not provided are not marked.

For example, as illustrated at 70, unitary flowmeters having bores with size number 6 are provided with flanges with size numbers 7 and 8. Stated another way, flowmeters with 4 inch bores are provided with 6 inch and 8 inch flanges. Stated in a more general way, flowmeters having bores with size number N are provided with flanges with size numbers (N+1) and (N+2). These combinations are explained in more detail below in connection with FIGS. 4A, 4B, 5A, 5B.

In another example, as illustrated at 72, unitary flowmeters having flanges with size number 6 are provided with bores with size numbers 4 and 5. Stated another way, flowmeters with 4 inch flanges are provided with 2 and 3 inch bores. Stated in a more general way, flowmeters having flanges with size number M are provided with bores with size numbers (M−2) and (M−1). These combinations are explained in more detail below in connection with an example illustrated in FIGS. 6A, 6B.

Each of the combinations provided as indicated by an X in FIG. 3 includes a standard vortex sensor interface on the unitary flowtube. This arrangement allows finished manufacture of the vortex flowmeter to be completed by simply assembling one of the unitary flowtube combinations with a vortex sensor assembly that is shaped to fit the standard sensor interface. The vortex flowtubes are calibrated using measured flow rates with the reducers and flanges in place. Then the calibrations are stored in the finished vortex flowmeter, preferably in an EEPROM included in the vortex flowmeter electronics. Any accuracy variation due to the expanders is corrected in the calibration process. In terms of the needs of a customer, the right combination of a desired flow range and a flowmeter flange that matches the size of the flanges of the piping system can be accurately, quickly and economically manufactured and shipped. There is no delay in waiting for a vortex flowmeter to be custom manufactured.

Figure 4A:
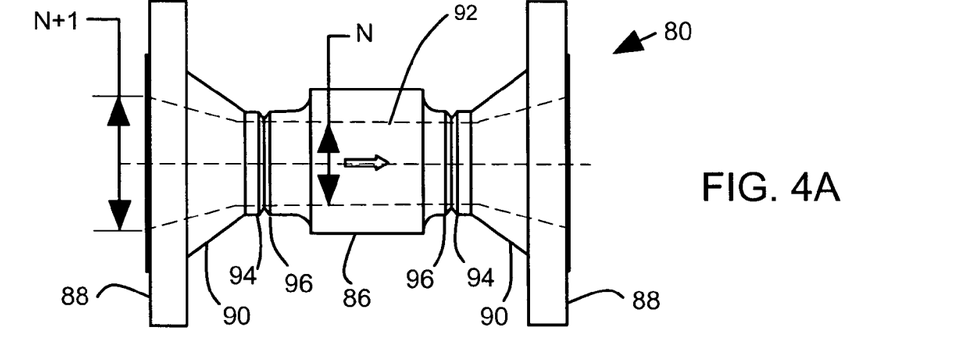
FIGS. 4A, 4B illustrate unitary flowtubes that have flowtube flanges of size numbers (N+1), (N+2) and bores of size number N.
Figure 4B:
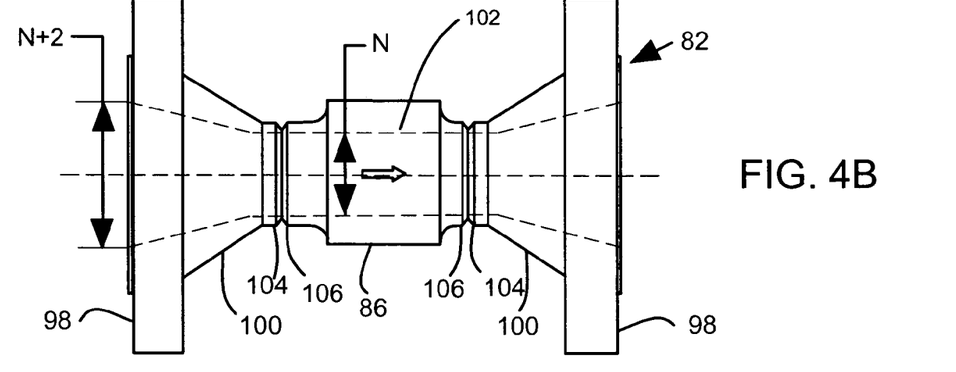

FIGS. 4A, 4B illustrate unitary flowtubes 80, 82 that have flowtube flanges of size numbers (N+1), (N+2) and bores of size number N. The two unitary flowtubes 80, 82 have bores with the same size number N and have the same selected flow measurement range as one another, such as the flow measurement range associated with the size number N in the examples shown in FIG. 1.

A manufacturing method for vortex flowmeter includes providing vortex sensor assemblies shaped to fit a standard sensor interface 86 on each of the unitary flowtube 80, 82.

The first unitary flowtube 80 is provided and has the standard sensor interface 86, flowtube flanges 88 of size number (N+1) coupled by tapered expanders 90 to a first bore 92 of size number N. The first unitary flowtube 80 provides a first flange size number (N+1) that is oversized by one step for the selected measurement range.

The second unitary flowtube 82 is provided and has the standard sensor interface 86, flowtube flanges 98 of size number (N+2) coupled by tapered expanders 100 to a second bore 102 of size number N. The second unitary flowtube 82 provides a second flange size number (N+2) that is oversized by two steps for the selected measurement range.

Finally, a vortex flowmeter with flanges having a selected size number N+1 or N+2 is selected and joined to one vortex sensor assembly at the standard sensor interface 86 on the selected one of the first and second unitary flowtubes 80, 82.

The expanders 90, 100 are preferably formed together with pipe flanges 88, 98 as a single seamless casting that is machined to final shape including weld necks 94, 104. The flowmeter bores 92, 102 are also machined to include weld necks 96, 106. The rims of the weld necks on the expanders 90, 100 are precisely aligned and joined by welding to the facing rims of the weld necks 96, 106 on the flowmeter bores 92, 102. The completed welds are carefully inspected and machined as needed to provide a completely smooth inside diameter for the unitary flowtube that is free of any misalignments or protrusions that could adversely affect the accuracy of the flow measurement. The completed unitary flowtubes 80, 82 are unitary, in other words, completely free of protruding joints where the expanders are welded to the bores. Because the joints are permanently welded, there is no danger of accidental disassembly and misalignment upon re-assembly at a customer location.

Figure 5A:
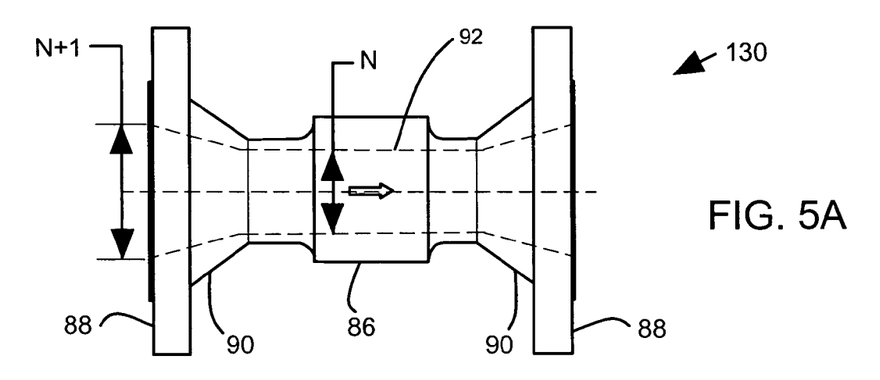
FIGS. 5A, 5B illustrate unitary flowtubes that are cast as a single unitary bodies.
Figure 5B:
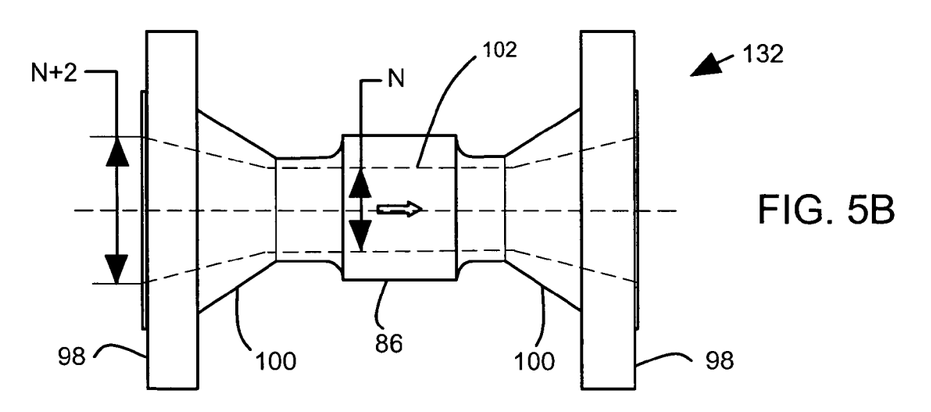

FIGS. 5A, 5B illustrate unitary flowtubes 130, 132 that are cast as single unitary bodies. The unitary flowtubes 130, 132 of FIGS. 5A, 5B are similar to the unitary flowtubes 80, 82 of FIGS. 4A, 4B. Reference numbers used in FIGS. 5A, 5B that are the same as reference numbers used in FIGS. 4A, 4B identify the same or similar features. The unitary flowtubes 130, 132 are each cast as a single unitary casting and machined to final shape, thereby avoiding any seams or gaskets between the bore and the expanders that could disturb flow and adversely affect accuracy. In other respects, the unitary flowtubes of FIGS. 5A, 5B are similar to the corresponding unitary flowtubes in FIGS. 4A, 4B.

The examples illustrated in FIGS. 4A, 4B, 5A, 5B correspond generally with the example 70 illustrated in FIG. 3.

Figure 6A:
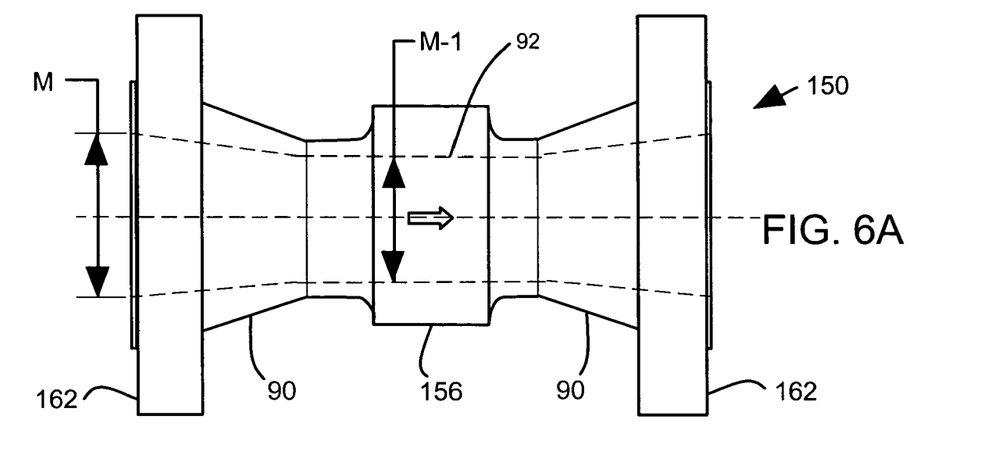
FIGS. 6A, 6B illustrate unitary flowtubes that have flowtube flanges of size number M and bores having size numbers (M−1), (M−2).
Figure 6B:
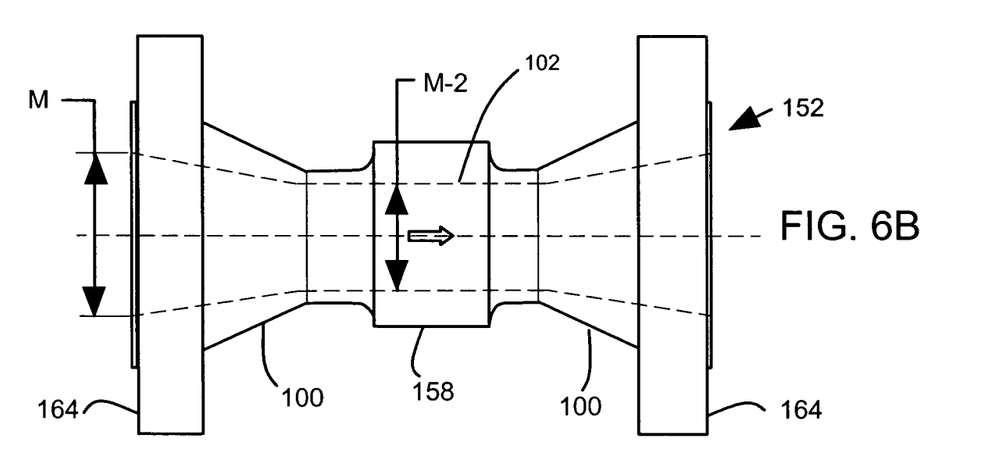

FIGS. 6A, 6B illustrate unitary flowtubes 150, 152 that have flowtube flanges 162, 164 of size number M and bores having size numbers (M−1) at 92, (M−2) at 102. The two unitary flowtubes 150, 152 have flanges with same size number M and have different selected flow measurement ranges, such as those associated with the size numbers M−1, M−2 in the example table shown in FIG. 1. The unitary flowtubes illustrated in FIGS. 6A, 6B are similar to the unitary flowtubes illustrated in FIGS. 5A, 5B and reference numbers used in FIGS. 6A, 6B that are the same as reference numbers used in FIGS. 5A, 5B identify the same or similar features.

A manufacturing method for vortex flowmeters includes providing vortex sensor assemblies shaped to fit a standard sensor interface 156, 158 on each of the unitary flowtube 150, 152.

The first unitary flowtube 150 having the standard sensor interface 156 is provided. The unitary flowtube 150 has flowtube flanges 162 of size number M coupled by tapered expanders 90 to a first bore 92 of size number (M−1) to provide a first flow measurement range.

The second unitary flowtube 152 having the standard sensor interface 158 is provided. The unitary flowtube 152 has flowtube flanges 164 of size number M coupled by tapered expanders 100 to a second bore 102 of size number (M−2) to provide a second flow measurement range.

In other respects, the construction of unitary flowtubes 150, 152 is similar to the construction of the unitary flowtubes 130, 132. The unitary flowtubes 150, 152 are made from a single casting, but can also be welded as described above in connection with FIGS. 4A, 4B. The examples illustrated in FIGS. 6A, 6B correspond with the example 72 illustrated in FIG. 3.

The examples illustrated in FIGS. 4A, 4B or FIGS. 5A, 5B are examples of a single bore size number with multiple flange size numbers according to example 70 in FIG. 3. The examples illustrated in FIGS. 6A, 6B are examples of multiple bore size numbers with a single flange size number according to example 72 in FIG. 3.

Figure 7:
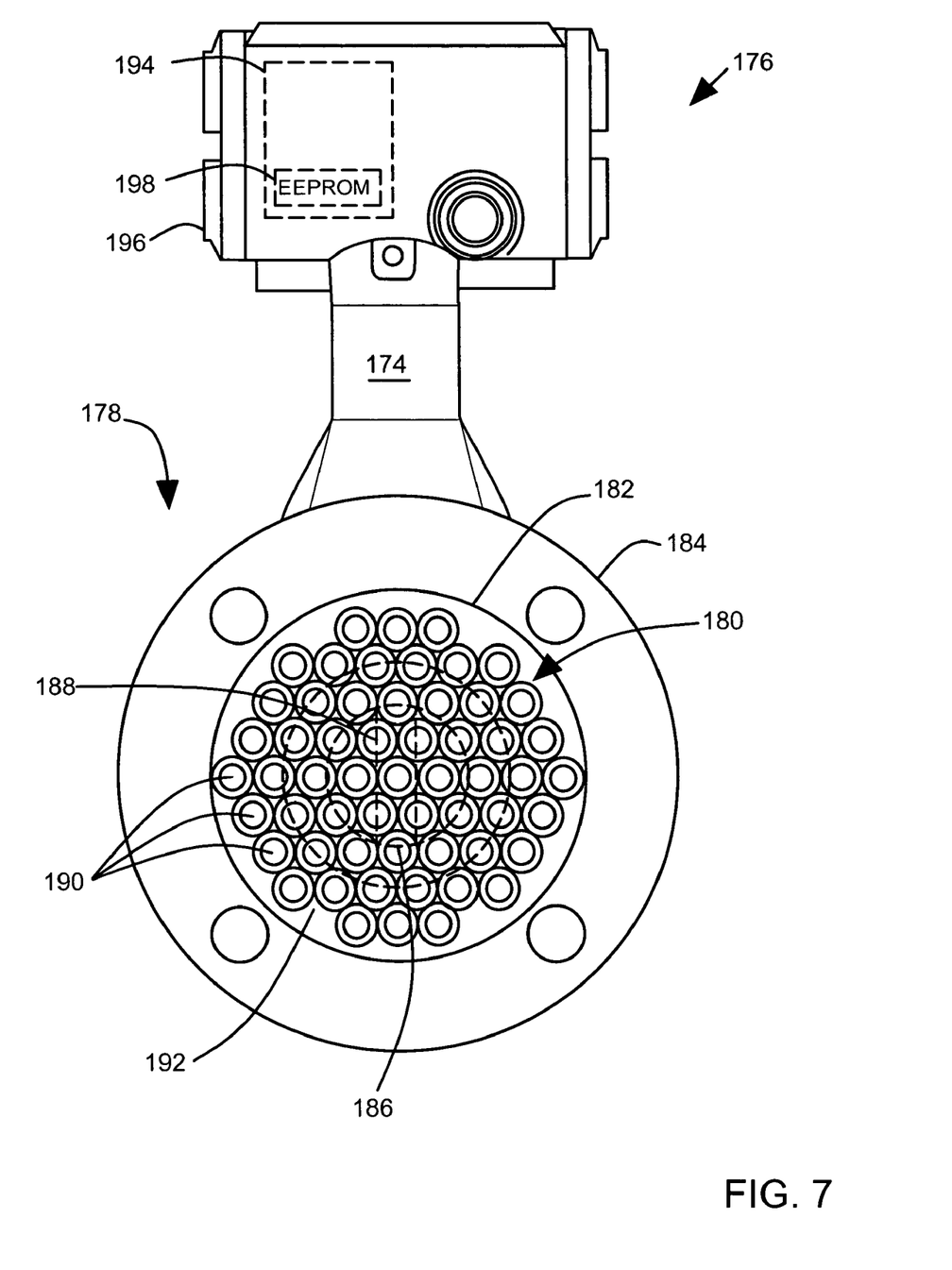
FIG. 7 illustrates a vortex flowmeter that includes a flow conditioner.

FIG. 7 illustrates a vortex flowmeter 176 with a unitary flowtube 178 (such as described above in connection with FIGS. 4A, 4B, 5A, 5B, 6A, 6B) that includes a flow conditioner 180. The vortex flowmeter 176 includes a vortex sensor assembly 174 that is mounted to a top flat surface of the unitary flowtube 178 by four bolts (not illustrated). The vortex sensor assembly 174 includes a standard sensor interface that is described in more detail below in connection with FIG. 10.

The flow conditioner 180 is arranged to fit in an inside diameter 182 of an upstream or inlet flange 184 on unitary flowtube 178. The flow conditioner is larger than a diameter of a bore 186 of the unitary flowtube 178. A vortex shedding bar 188 is secured in the bore 186. The flow conditioner 180 includes multiple holes 190 which allow fluid to flow through the flow conditioner. The flow conditioner 180 also includes a solid portion 192 surrounding the holes 190 and blocking fluid flow. The flow conditioner 180 is described in more detail below in connection with FIGS. 8, 9A, 9B.

Vortex flowmeter electronics 194 are provided in a transmitter housing 196 that can be locally mounted as shown, or remotely mounted. The vortex flowmeter electronics preferably includes an electrically erasable read only programmable memory (EEPROM) 198 that stores the calibration data that is obtained by testing the flowtube 184 in a flow test facility.

While round holes 190 are illustrated in FIG. 7, it will be understood that the shape of the holes can vary depending on the needs of the application. Holes 190 can be oval or long slots.

Figure 8:
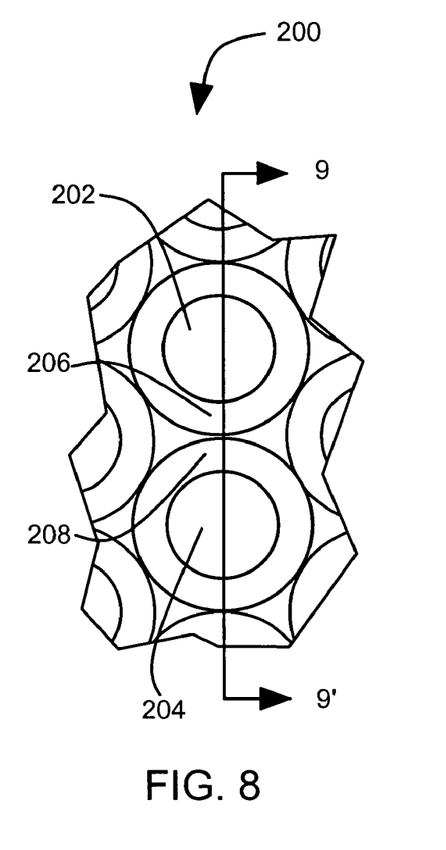
FIG. 8 illustrates an enlarged view of a portion of a flow conditioner.

FIG. 8 illustrates an enlarged broken away view of a portion of a flow conditioner 200. The flow conditioner 200 includes holes 202, 204 with edges 206, 208 that are not sharp, but are instead smoothed or streamlined to reduce turbulence and better condition the flow. The flow conditioner 200 straightens flow so that the flow tends to enter the unitary flowtube relatively free of large vortices that could otherwise disturb measurement accuracy.

Figure 9A:
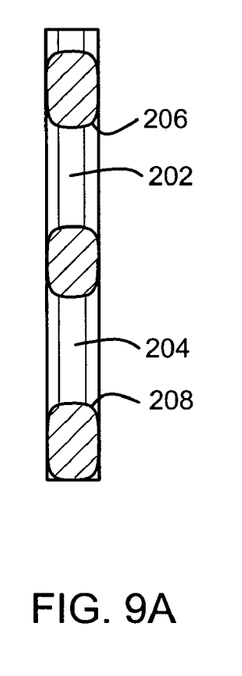
FIG. 9A illustrates a cross-section along line 9–9' in FIG. 8 of a flow conditioner that is formed from a thin plate.

FIG. 9A illustrates a cross-section along line 9–9' in FIG. 8 of a flow conditioner that is formed from a thin plate. The flow conditioner comprises a plate perforated by multiple holes 202, 204. The plate has streamlined edges 206, 208 around the multiple holes 202, 204.

Figure 9B:
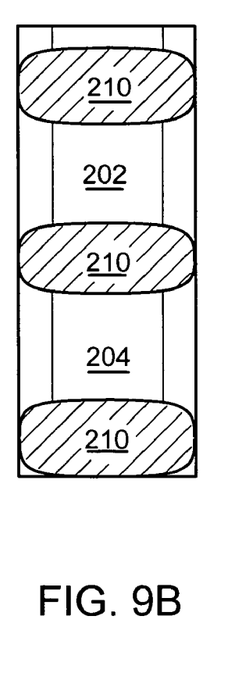
FIG. 9B illustrates a cross-section along line 9–9' in FIG. 8 of a flow conditioner that is formed as a series of vanes.

FIG. 9B illustrates a cross-section along line 9–9' in FIG. 8 of a flow conditioner that is formed as a series of streamlined vanes 210 in a plate that is thicker than the plate illustrated in FIG. 9A.

Figure 10:
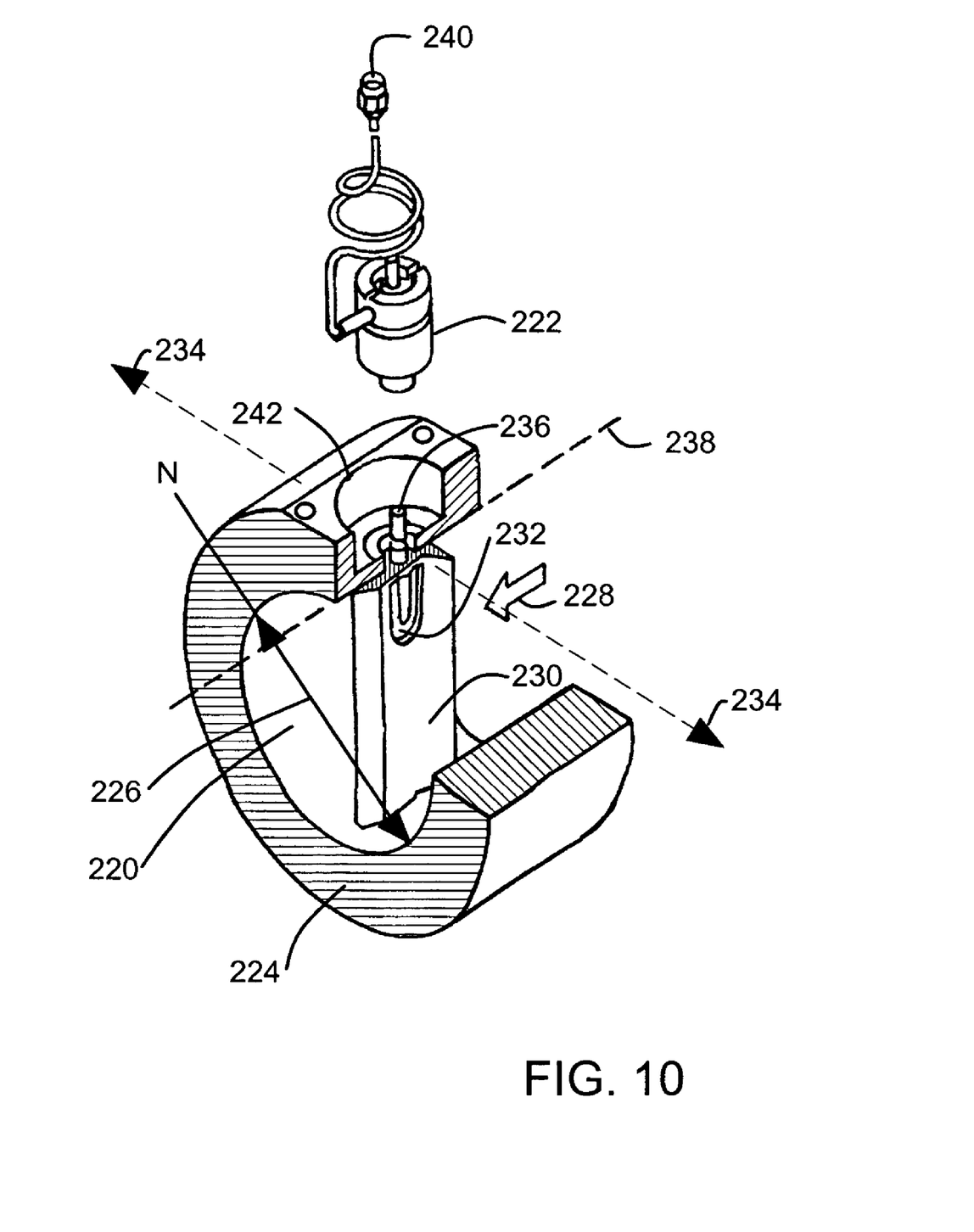
FIG. 10 illustrates an exploded view of a vortex sensor assembly and a standard sensor interface on a unitary flowtube.

FIG. 10 illustrates a fragmentary exploded view of a unitary flowtube bore 220 and a vortex sensor assembly 222. Flowmeter bore 220 is surrounded by a spool shaped cross section 224 that joins with reducers as explained above in connection with FIGS. 4A, 4B. The spool 224 can be welded to the reducers at weld neck flanges or integrally cast with the reducers. The spool has an inner diameter 226 of size number N which defines the bore 220. Fluid flows through the bore 220 in a direction indicated by an arrow 228.

A vortex shedding bar 230 extends transversely across the bore 220 and is secured at both ends to the inner diameter surface of the spool 224. A small flexure section includes a thin sensing diaphragm 232 which is supported along peripheral portions by the vortex shedding bar 230. The sensing diaphragm 232 is open to the fluid for deflecting laterally in the direction of arrows 234 in response to the alternating forces applied by vortices shed by the vortex shedding bar 230. A beam 236 is coupled to the sensing diaphragm 232 for transferring deflection of sensing diaphragm 232 through the spool 224. The beam 236 rotates or "rocks" about a pivot axis 238 in response to deflection of the sensing diaphragm 232, thereby applying a lateral force on the piezoelectric vortex sensor assembly 222 attached to spool 224. Piezoelectric vortex sensor assembly 222 senses the lateral movement of the beam 236 and generates a piezoelectric sensor signal on an electrical output 240 having a frequency that is representative of the frequency of vortex shedding and thus the flow rate of the fluid flowing through bore 220. The electrical output 240 is connected to vortex flowmeter electronics. The vortex sensor assembly 222 is shaped to fit in a hole 242 in a top flat surface of the spool 224 and engage the beam 236. The size and shape of the hole 242 and the beam 236 are a standardized sensor interface on the unitary flowtube. The arrangement shown in FIG. 10 can be as taught in U.S. Pat. No. 4,926,695 Kleven et al., which is hereby incorporated by reference.

Although the present invention has been described with reference to preferred embodiments, workers skilled in the art will recognize that changes may be made in form and detail without departing from the scope of the invention.

What is claimed is:

1. A vortex flowmeter for installation between pipe flanges of size N, comprising:
   A. a vortex sensor assembly shaped to fit a standard sensor interface on a unitary flowtube, the standard sensor interface being common to a plurality of bore size numbers;
   B. a unitary flowtube having the standard sensor interface and having upstream and downstream flowtube flanges with nominal pipe sizes of size N, and a bore with a nominal pipe size of size number (N–A) where A is an integer in the range 1,2 and having diameter expanders coupling between the flowtube flanges and the bore; and
   C. the unitary flowtube being formed as a unitary casting that is free of seams.

2. The vortex flowmeter of claim 1 further comprising a flow conditioner that comprises a plate perforated by multiple holes that is part of the unitary casting.

3. The vortex flowmeter of claim 2 wherein the plate has streamlined edges around the multiple holes.

4. The vortex flowmeter of claim 2 wherein the flow conditioner comprises vanes having streamlined edges.

5. the vortex flowmeter of claim 1, further comprising:
   a measured calibration with the diameter expanders, and flanges in place stored in the vortex flowmeter.

6. A vortex flowmeter for installation between pipe flanges of size N, comprising:
   A. a vortex sensor assembly shaped to fit a standard sensor interface on a unitary flowtube, the standard sensor interface being common to a plurality of nominal bore size numbers;
   B. a unitary flowtube having the standard sensor interface and having upstream and downstream flowtube flanges with nominal pipe sizes of size N, and a bore with an nominal pipe size of a size number at least as small as (N–1), and having diameter expanders coupling between the flowtube flanges and the bore; and
   C. a flow conditioner of nominal pipe size number N across an opening in the upstream flange.

7. The vortex flowmeter of claim 6 wherein the flow conditioner comprises a plate perforated by multiple holes.

8. The vortex flowmeter of claim 7 wherein the plate has streamlined edges around the multiple holes.

9. The vortex flowmeter of claim 6 wherein the flow conditioner comprises vanes having streamlined edges.

10. the vortex flowmeter of claim 6, further comprising:
    a measured calibration with the diameter expander, flanges and flow conditioner in place stored in the vortex flowmeter.

* * * * *